(12) United States Patent
Bortoli et al.

(10) Patent No.: US 10,823,151 B2
(45) Date of Patent: Nov. 3, 2020

(54) RAM AIR TURBINE SINGLE-UNIT NOSE MASS

(71) Applicant: Hamilton Sundstrand Corporation, Charlotte, NC (US)

(72) Inventors: Stephen Michael Bortoli, Roscoe, IL (US); Timothy Scott Konicek, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/152,590

(22) Filed: Oct. 5, 2018

(65) Prior Publication Data

US 2020/0109701 A1  Apr. 9, 2020

(51) Int. Cl.
| | | |
|---|---|---|
| *F03D 80/00* | (2016.01) | |
| *F03D 9/32* | (2016.01) | |
| *B64D 41/00* | (2006.01) | |
| *F03D 1/00* | (2006.01) | |

(52) U.S. Cl.
CPC ........... *F03D 80/00* (2016.05); *B64D 41/007* (2013.01); *F03D 1/00* (2013.01); *F03D 9/32* (2016.05); *F05B 2220/31* (2013.01); *F05B 2240/00* (2013.01); *F05B 2260/966* (2013.01); *F05B 2280/1021* (2013.01)

(58) Field of Classification Search
CPC ... F01D 5/00; F01D 5/22; F01D 5/141; F01D 5/147; F01D 1/02; F03B 13/00; F03B 2220/20; F03B 2220/31; F03B 2220/60; F03B 2220/602; F03B 2240/24; F03B 2240/121; F03D 80/00; F05B 2220/31; F05B 2250/241; B64D 2221/00; B64D 41/00; B64D 2013/0618; B64D 2013/0644; F42B 10/46; F42B 10/52

See application file for complete search history.

(56) References Cited

U.S. PATENT DOCUMENTS

| 3,114,319 A | * | 12/1963 | Smith | ..................... F42B 10/46 |
|---|---|---|---|---|
| | | | | 343/872 |
| 4,140,433 A | * | 2/1979 | Eckel | ........................ F03D 1/04 |
| | | | | 415/209.1 |
| 4,743,163 A | * | 5/1988 | Markunas | ................. F01D 7/02 |
| | | | | 416/137 |

(Continued)

FOREIGN PATENT DOCUMENTS

EP    2199205 A2    6/2010

OTHER PUBLICATIONS

The Extended European Search Report for Application No. 19201545.1-1004; dated Feb. 5, 2020; 9 pages.

*Primary Examiner* — Nathaniel E Wiehe
*Assistant Examiner* — Ryan C Clark
(74) *Attorney, Agent, or Firm* — Cantor Colburn LLP

(57) ABSTRACT

A single-unit nose cone for a ram air including: a dome portion located at a forward end of the single unit nose cone; a dome stand portion adjacent to the dome portion; a seat portion adjacent to the dome stand portion; and a stem portion adjacent to the seat portion and located at an aft end of the single-unit nose cone, wherein the dome portion, the dome stand portion, the seat portion, and the stem portion are composed from a single piece of material having a density of about 0.286 pound/cubic inch (7916 kilogram/cubic meter).

17 Claims, 5 Drawing Sheets

(56) References Cited

U.S. PATENT DOCUMENTS

| | | | | |
|---|---|---|---|---|
| 5,558,495 | A * | 9/1996 | Parker | B64D 41/007 416/95 |
| 8,814,520 | B2 * | 8/2014 | Russ | B64D 41/007 188/39 |
| 2010/0260605 | A1 | 10/2010 | Macfarlane et al. | |
| 2013/0230401 | A1 | 9/2013 | Bannon et al. | |
| 2013/0255277 | A1 | 10/2013 | Macchia et al. | |
| 2015/0361804 | A1 * | 12/2015 | Hubbert | F01D 5/066 415/202 |
| 2018/0119616 | A1 * | 5/2018 | Scott | B64C 11/14 |

* cited by examiner

RAM AIR TURBINE SINGLE-UNIT NOSE MASS

BACKGROUND

The subject matter disclosed herein generally relates to ram air turbines (RAT), and more specifically to nose cones for use in a RAT.

RATs are commonly used on modern aircraft to provide a secondary and/or emergency power source in the event the primary power source is insufficient or fails. A RAT incorporates a turbine that extracts power from an air stream proximate the aircraft in flight. U.S. Pat. No. 4,743,163 to Markunas et al., owned by the assignee of this application, and incorporated herein by reference, describes a typical RAT in current use. The turbine that remains internal to the aircraft until needed. When additional power is required, a door in the aircraft's fuselage will open and the actuator will deploy the RAT's turbine into the freestream air. The turbine is rotated by the freestream air and the rotational torque from the turbine is transferred through a drivetrain to be converted into electrical power by a generator. A RAT may also be used to drive a hydraulic pump. RATs tend to rotate at relatively high velocities, which makes balancing a RAT in rotation important to avoid vibrations. U.S. Pat. No. 8,814,520 B2 to Russ and Bannon owned by the assignee of this application, and incorporated herein by reference, describes a typical RAT in current use.

BRIEF SUMMARY

According to one embodiment, a single-unit nose cone for a ram air turbine is provided. The single-unit nose cone for a ram air turbine include: a dome portion located at a forward end of the single unit nose cone; a dome stand portion adjacent to the dome portion; a seat portion adjacent to the dome stand portion; and a stem portion adjacent to the seat portion and located at an aft end of the single-unit nose cone, wherein the dome portion, the dome stand portion, the seat portion, and the stem portion are composed from a single piece of material having a density of about 0.286 pound/cubic inch (7916 kilogram/cubic meter).

In addition to one or more of the features described above, or as an alternative, further embodiments may include that the dome stand portion is interposed between the dome portion and the seat portion.

In addition to one or more of the features described above, or as an alternative, further embodiments may include that the seat portion is interposed between the dome stand portion and the stem portion.

In addition to one or more of the features described above, or as an alternative, further embodiments may include that the seat portion is interposed between the dome stand portion and the stem portion.

In addition to one or more of the features described above, or as an alternative, further embodiments may include that the material is at least one of steel and aluminum.

In addition to one or more of the features described above, or as an alternative, further embodiments may include that the stem portion further includes an opening configured to operably connect to a turbine shaft of the ram air turbine, wherein the opening opens toward the aft end.

In addition to one or more of the features described above, or as an alternative, further embodiments may include: an opening extending from a peak of the dome portion at the forward end of the single unit nose cone to the opening.

According to another embodiment, a ram air turbine assembly is provided. The ram air turbine assembly including: a nose housing having a snap ring groove; a single-unit nose cone within the nose housing and secured to the nose housing via a snap ring in the snap ring groove, the single unit nose cone including; a dome portion located at a forward end of the single unit nose cone; a dome stand portion adjacent to the dome portion; a seat portion adjacent to the dome stand portion, wherein the snap ring secures the sing-unit nose cone within the nose housing via the seat portion; and a stem portion adjacent to the seat portion and located at an aft end of the single-unit nose cone, wherein the dome portion, the dome stand portion, the seat portion, and the stem portion are composed from a single piece of material having a density of about 0.286 pound/cubic inch (7916 kilogram/cubic meter).

In addition to one or more of the features described above, or as an alternative, further embodiments may include that the dome stand portion is interposed between the dome portion and the seat portion.

In addition to one or more of the features described above, or as an alternative, further embodiments may include that the seat portion is interposed between the dome stand portion and the stem portion.

In addition to one or more of the features described above, or as an alternative, further embodiments may include that the seat portion is interposed between the dome stand portion and the stem portion.

In addition to one or more of the features described above, or as an alternative, further embodiments may include that the material is at least one of steel and aluminum.

In addition to one or more of the features described above, or as an alternative, further embodiments may include that the stem portion further includes an opening configured to operably connect to a turbine shaft of the ram air turbine, wherein the opening opens toward the aft end.

In addition to one or more of the features described above, or as an alternative, further embodiments may include that the single-unit nose cone further includes: an opening extending from a peak of the dome portion at the forward end of the single unit nose cone to the opening.

In addition to one or more of the features described above, or as an alternative, further embodiments may include a preload bolt located within the opening.

Technical effects of embodiments of the present disclosure include composing a nose cone of a ram air turbine assembly out of a single material to control vibrational characteristics of the ram air turbine assembly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
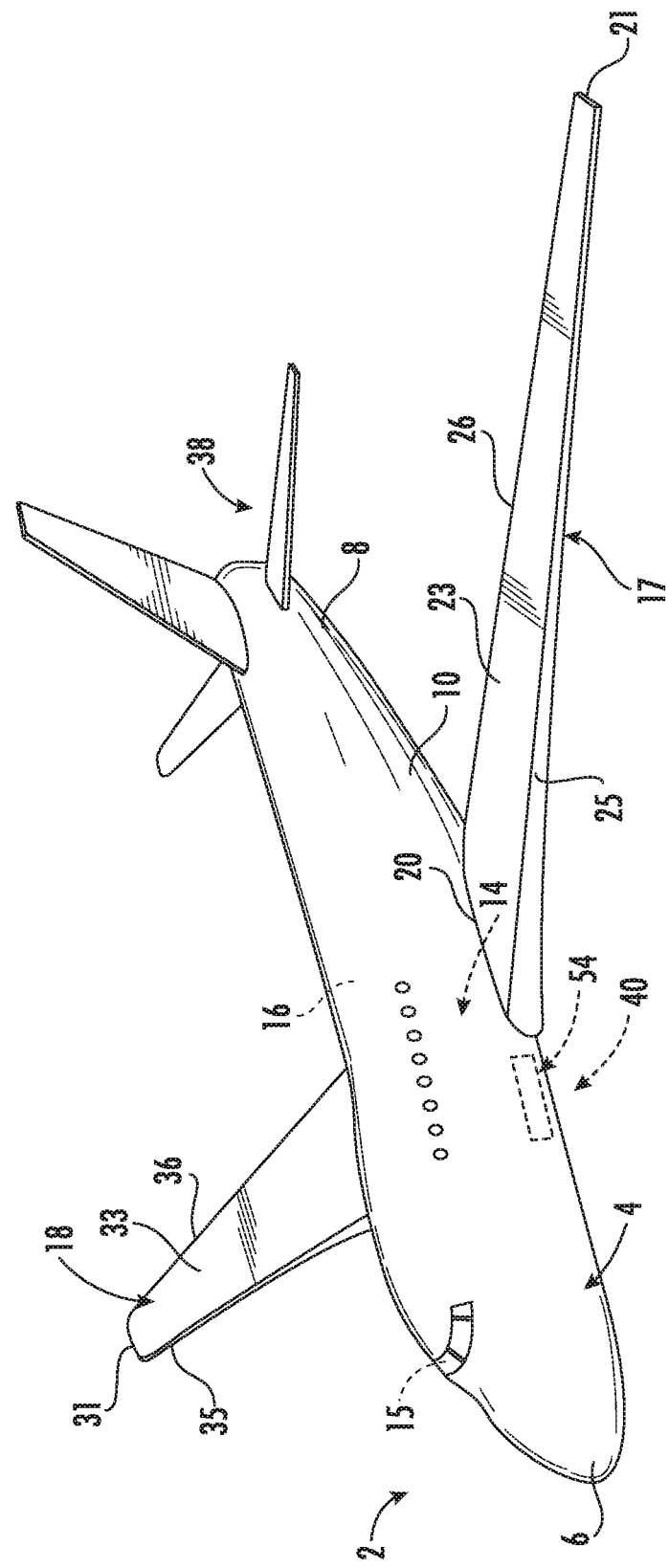
FIG. 1 is a perspective view of an aircraft that may incorporate embodiments of the present disclosure.
Figure 2:
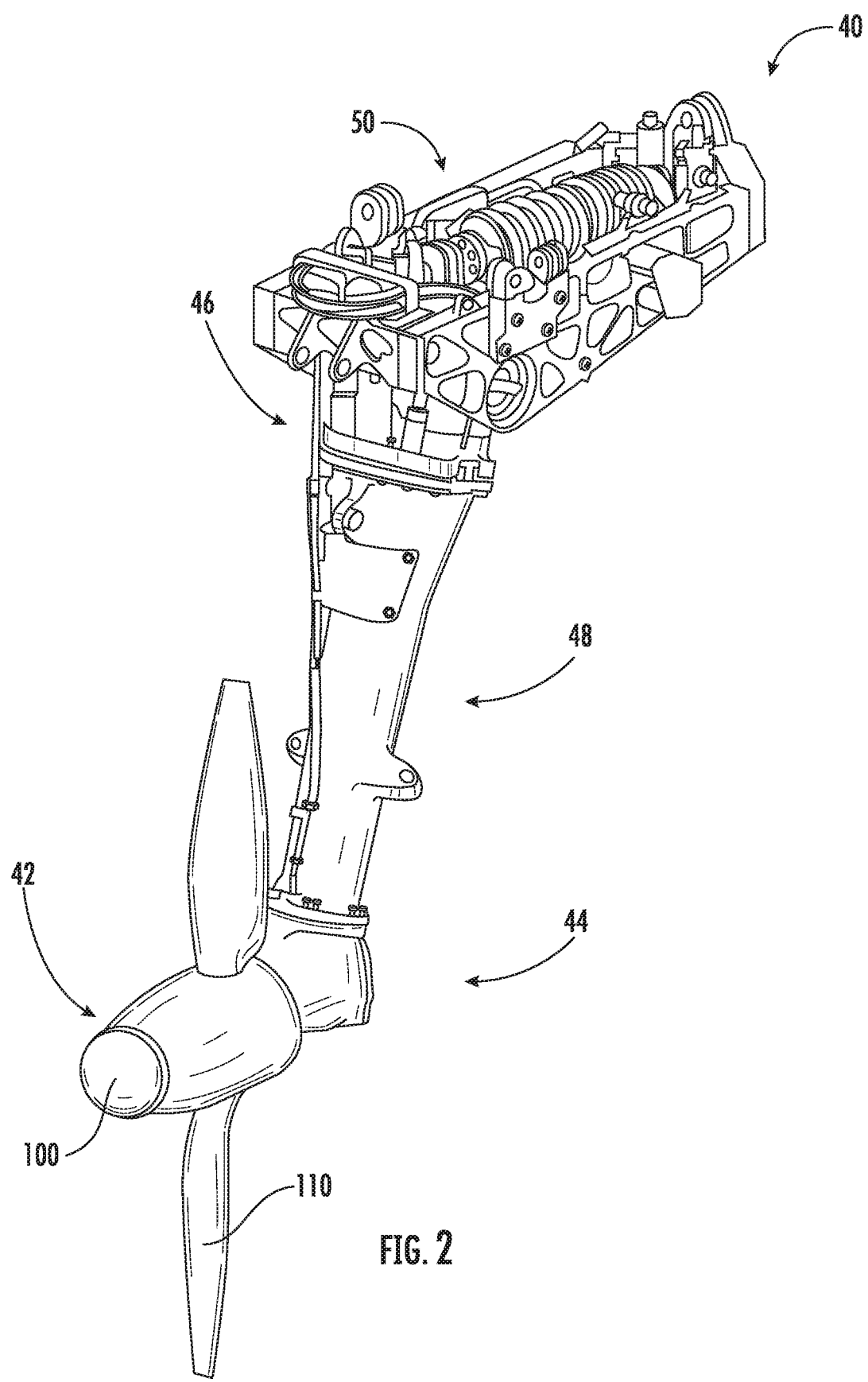
FIG. 2 is a perspective view of ram air turbine (RAT) assembly that may incorporate embodiments of the present disclosure.

Referring now to FIGS. 1 and 2. FIG. 1 shows a perspective view of an aircraft 2 that may incorporate embodiments of the present disclosure. FIG. 2 shows a perspective view of ram air turbine (RAT) assembly 40 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38.

Aircraft 2 includes a ram air turbine (RAT) assembly 40 mounted within fuselage 4 or nose portion 6. When additional electrical and/or hydraulic power is required, a compartment door 54 in the fuselage 4 will open and an actuator 50 (See FIG. 2) will actuate to deploy the RAT assembly 40 into the freestream air. As shown in FIG. 2, the RAT assembly 40 may include a turbine assembly 42, a gearbox assembly 44, a shaft assembly 48, a generator 46, and the actuator 50. As the turbine assembly 42 rotates, the rotational torque is transferred from the turbine assembly 42, through the gearbox assembly 44 to a driveshaft (not shown) in the strut assembly 48, and then to the generator 46. The generator 46 may be an electrical generator, hydraulic pump, or both an electrical generator and a hydraulic pump.

The Turbine assembly includes a nose assembly 100 and blades 110 attached to the nose assembly 100. While two blades 110 are illustrated in FIG. 2, it is understood that the RAT assembly 40 may incorporate any number of blades 110. As the aircraft 2 moves through the air, airflow rotates the blades 110 and the nose assembly 100. As the nose assembly 100 increases in rotational velocity, vibrations of the nose assembly 100 and the overall RAT assembly 40 may increase. Embodiments disclosed herein seek to modify or reduce the magnitude of a resonance frequency of the RAT assembly 40 to desired levels by adjusting the center of mass of the nose assembly.

Figure 3:
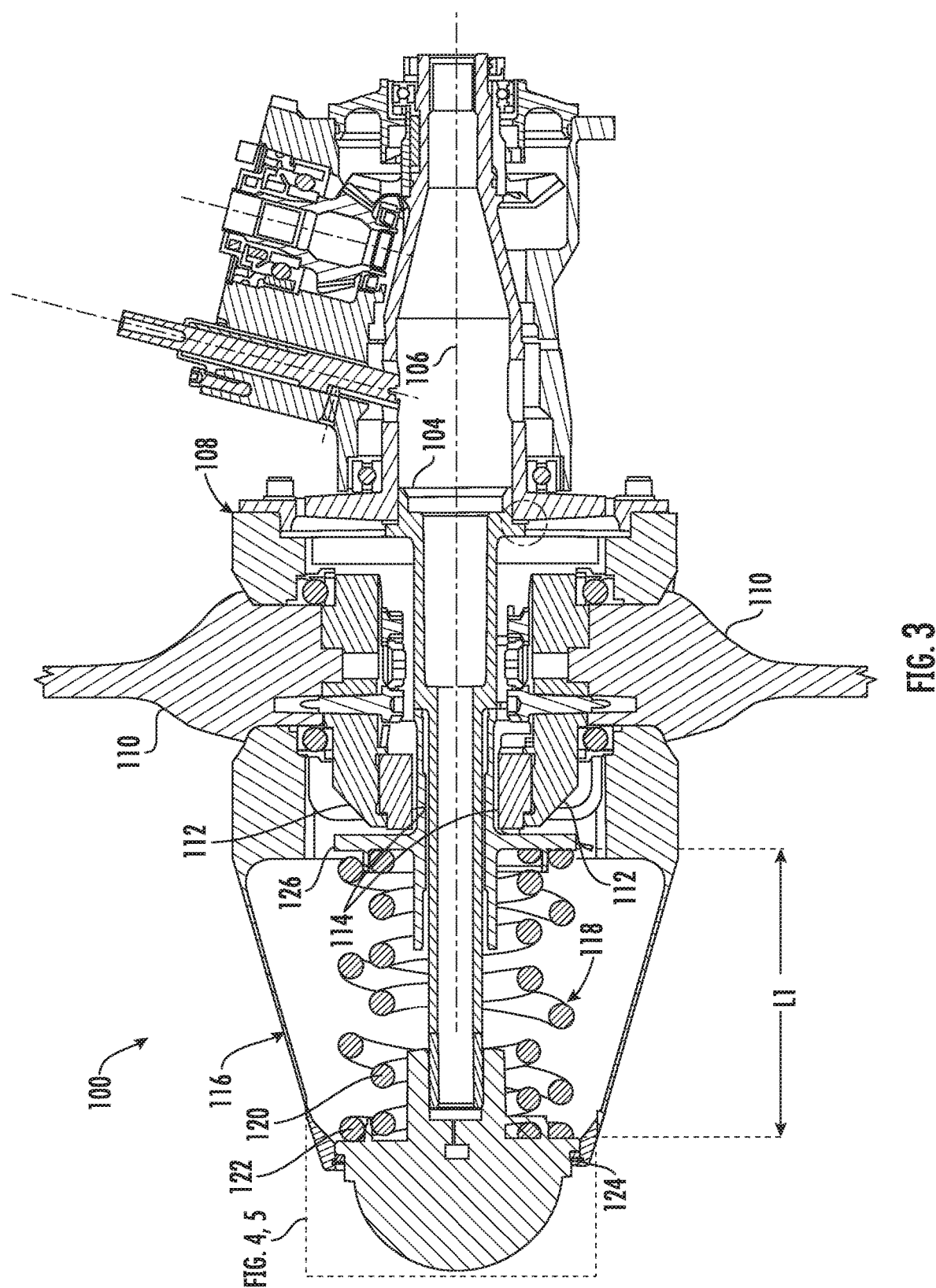
FIG. 3 is a cut-away view of a nose assembly of the RAT assembly of FIG. 2, according to an embodiment of the present disclosure.

Referring now to FIG. 3, with continued reference to FIGS. 1-2, a cross-sectional view of a nose assembly 100 of the RAT assembly 40 is illustrated. Markunas et al. describes the general operation of such a RAT assembly 40 in detail. Basically, as a turbine shaft 104 rotates about a turbine shaft axis 106, it rotates a rotor 108 attached thereto. Rotor blades 110 attached to the rotor 108 are able to rotate between a fine pitch position and a coarse pitch position. For example, a fine pitch position may be about 9 degrees and a coarse pitch position may be about 58 degrees.

A rotor flyweight assembly 112 for each rotor blade 110 serves to act on its rotor blade 110 as the rotor 108 rotates on the turbine shaft 104 by means of an associated flyweight 114. A spring-loaded governor assembly 116 for controlling the position of the rotor blades 110 that has its springing, represented by a coaxial spring set 118 with an inner spring 120 and an outer spring 122, retained by a stationary outer spring seat 124 and a movable inner yoke plate 126 that slides on the turbine shaft 104 to counteract the action of the flyweight assemblies 112.

As the speed of the rotor 108 increases, the force of the flyweight assemblies 112 increases, causing the positions of the corresponding rotor blades 110 to shift in pitch and push on the yoke plate 126 to compress the spring set 118 between the yoke plate 126 and the spring seat 124, thus changing the length of the spring set 118, as represented by dimension "L1" in FIG. 1. This increases the force of the spring set 118 to balance the force of the flyweight assemblies 112 for any rotational speed of the rotor 108 within the operational range of the RAT assembly 40. Consequently, this force balance arrangement causes the rotor blades 110 to assume increasing pitch with increasing speed of the turbine shaft 104.

Upon assembly or rebuild of the RAT assembly 40, it is necessary to balance the rotor 108 to minimize vibration. Balancing the rotor 108 involves rotating the turbine shaft 104 at a desired speed and adding balance weights to the rotor 108 to minimize vibration. Unfortunately, the position or pitch of the rotor blades 110 and components of the governor assembly 116 tends to alter the dynamic balance of the rotor 108. In many instances, it would be desirable to balance the rotor 108 at a speed within its operating range such that the rotor blades 110 would assume a generally mid-range position to limit imbalance at both the fine and coarse positions of the rotor blades 110. In other instances, when the rotor 108 has a characteristic resonant frequency that corresponds to a pitch of the rotor blades 110 between the fine and coarse positions, it would be desirable to balance the rotor 108 at a speed such that the rotor blades 110 would assume the resonant frequency pitch position to minimize imbalance at the resonant frequency of the rotor 108. U.S. Pat. No. 8,814,520 B2 to Russ and Bannon describes a balancing method in detail. The use of an appropriately designed nose mass can alter the turbine resonance behavior thereby tuning the RAT assembly 40 such that imbalance (or x/rev forcing functions are less damaging to the RAT assembly 40 and aircraft 2 structure.

Figure 4:
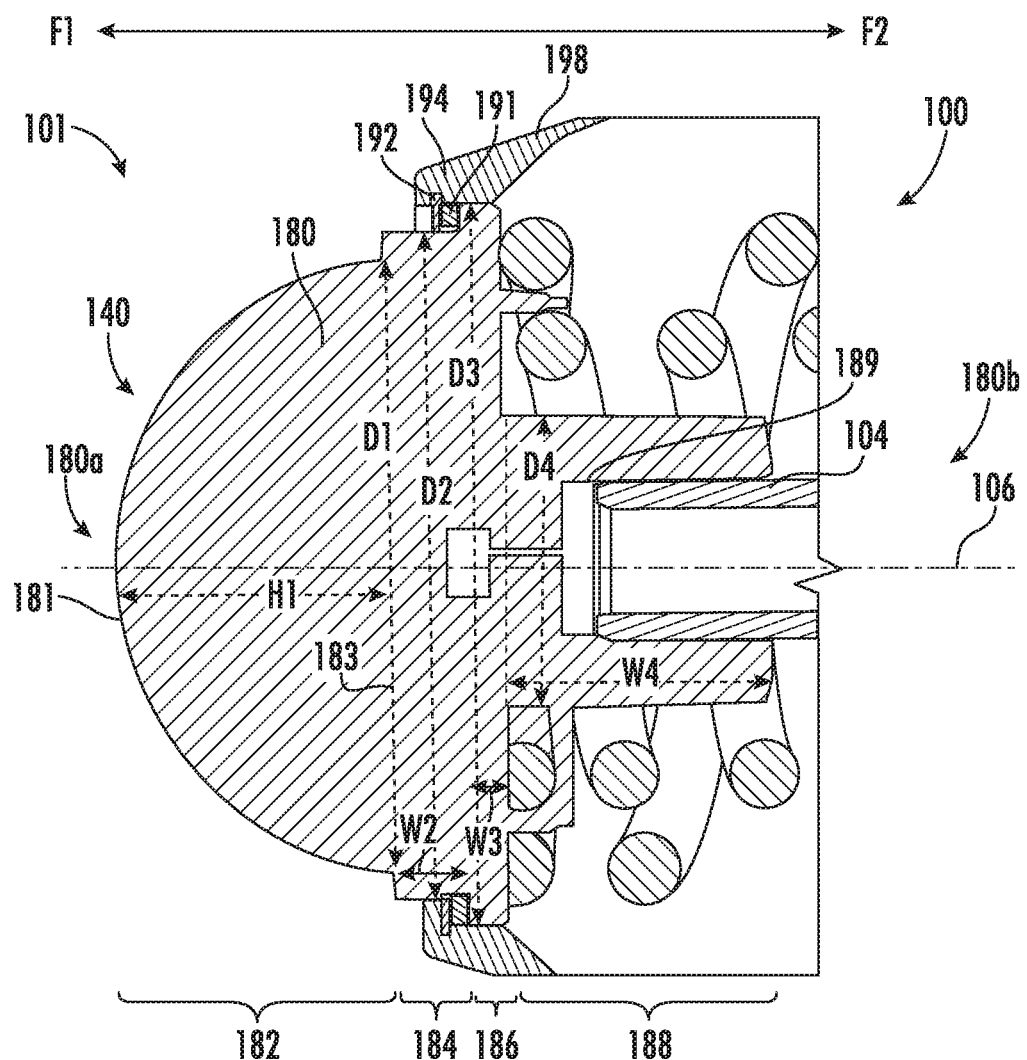
FIG. 4 is an enlarged cut-away view of a single-unit nose cone of the nose assembly of FIG. 3, according to an embodiment of the present disclosure.
Figure 5:
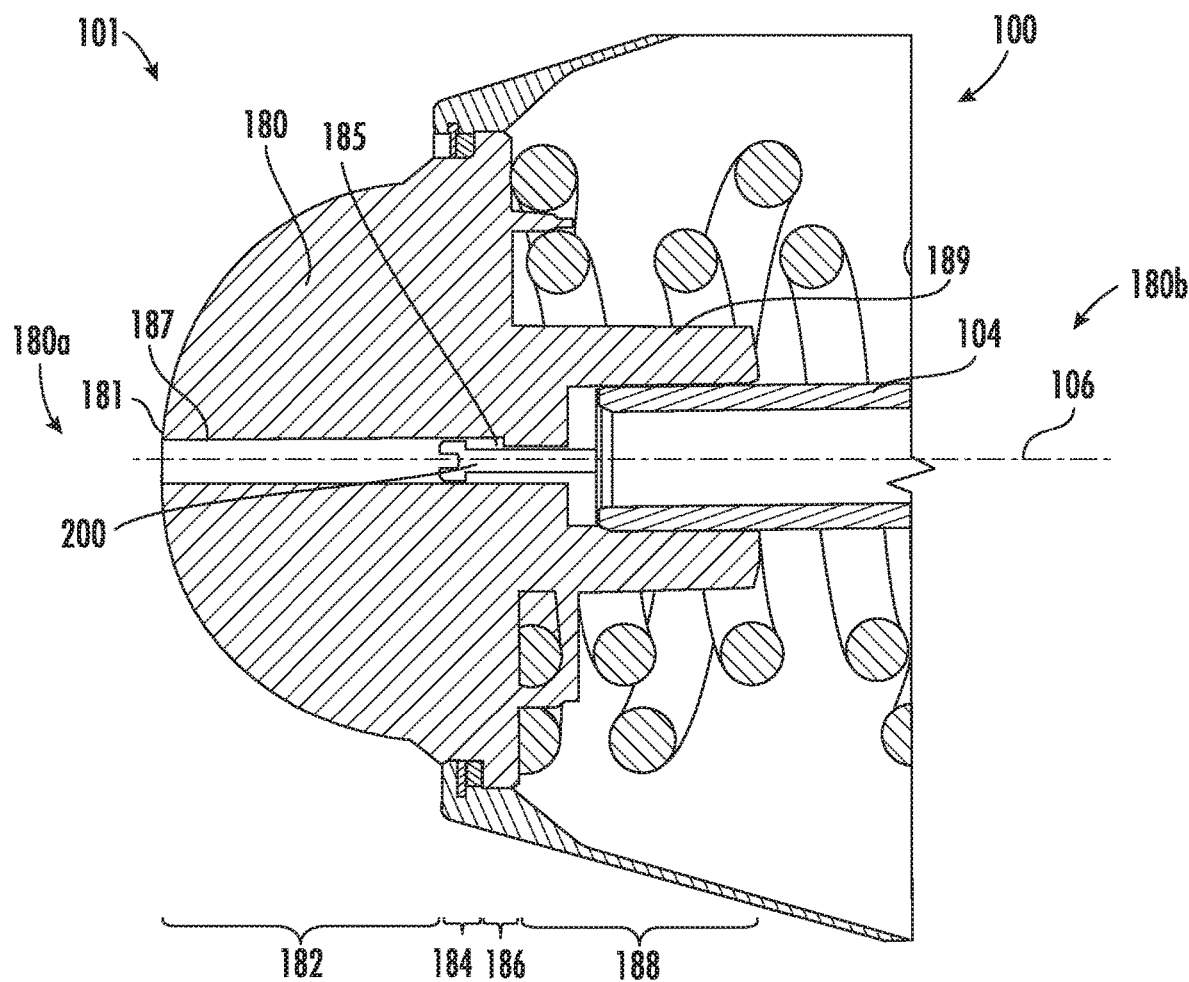
FIG. 5 is an enlarged cut-away view of a single-unit nose cone of the nose assembly of FIG. 3, according to an embodiment of the present disclosure.

Referring now to FIG. 4-5, with continued reference to FIGS. 1-3, a cross-sectional view of a forward portion 101 of the nose assembly 100 of the RAT assembly 40 is illustrated. As mentioned above, upon assembly or rebuild of the RAT assembly 40, it is necessary to balance the rotor 108 to minimize vibration. One element in balancing the rotor 108 is the mass of the nose fairing 140 of the nose assembly 100. The nose fairing 140 serves a dual purpose of fairing air around the nose assembly 101, while also acting a mass point providing a favorable change to the dynamic response of the RAT assembly 40, thus reducing the energy of a vibration mode shape which in turn, reduces loads on the RAT assembly 40 and aircraft 2. Conventionally, a nose fairing may be composed of multiple individual parts assembled together including one or more strategically placed tungsten weights to serve as point masses in balancing the rotor 108. Tungsten weights are expensive and nose fairings being composed of multiple parts increases build time, thus resulting in increased cost for assembly, deassembly, and reassembly of a conventional nose fairing. Embodiments disclosed herein seek to address these matters associated with conventional nose fairings having tungsten weights and multiple individual parts.

As shown in FIG. 4, the nose assembly 100 of the RAT assembly 40 includes single-unit nose cone 180 composed of a single piece of material. The single-unit nose cone 180 may be composed of a single piece of material that is homogenous and uniform in density throughout. In an embodiment, the material has density of 0.286 pound/cubic inch (7916 kilogram/cubic meter). In another embodiment, the material is at least one of steel and aluminum. The single-unit nose 180 may be fabricated using additive manufacturing or traditional machining (e.g., subtractive manufacturing, such as, for example, a lathe). In an embodiment, the single-unit cone 180 weighs about 10.28 pounds (4.662 kilograms) and has a volume of about 35.94 cubic inches (588 cubic centimeters).

The single-unit nose cone 180 may include a dome portion 182 located at a forward end 180a of the single-unit nose cone 180, a dome stand portion 184, a seat portion 186, and a stem portion 188 located at an aft end 180b of the single-unit nose cone 180. The dome portion 182, the dome stand portion 184, the seat portion 186, and the stem portion 188 are composed from a single piece of material having a density of about 0.286 pound/cubic inch (7916 kilogram/cubic meter).

As shown in FIG. 4, as organized from forward F1 to aft F2, the dome portion 182 is adjacent to the dome stand portion 184, the dome stand portion 184 is adjacent to the seat portion 186, and the seat portion 186 is adjacent to the stem portion 188. The dome stand portion 184 is interposed between the dome portion 182 and the seat portion 186. The seat portion 186 is interposed between the dome stand portion 184 and the stem portion 188. The dome portion 182 is a spherical radius shape having a dome height H1 about equal to about half the diameter D1. It is understood that the embodiments disclosed herein are not limited to the dome portion 182 being a spherical radius shape as illustrated in FIG. 4, thus the dome portion 182 may also have a parabolic shape, a cone shape, a blunt shape, a stepped shape, or any other geometric shape known to one of skill in the art. The dome height H1 is measured from a base 183 of the dome portion 182 to a peak 181 of the dome portion 182 at the forward end 180a. The dome stand portion 184 is located proximate the dome base 183.

The dome stand portion 184 may have a width W2 about equal to 0.55 inches as measured along the turbine shaft axis 106. The dome stand portion 184 may have a diameter D2 such that you have room to compress the snap ring 192 during installation.

The single-unit nose cone 180 is located within the nose housing 198 and is secured to the nose housing 198 via a snap ring 192 in a snap ring grove 194. The snap ring 192 secures the sing-unit nose cone 180 within the nose housing 198 via the seat portion 186. The single-unit nose cone 180 is secured within the nose assembly 100 by the seat portion 186 and a snap ring 192. The snap ring 192 locks into a snap ring groove 194 within the nose housing 198. Shims 191 may be utilized to adjust the snap ring 192. The seat portion 186 may have a width W3 as measured along the turbine shaft axis 106. The seat portion 186 may have a diameter D3 about equal to 5.0 inches (12.7 centimeters) as measured perpendicular to the turbine shaft axis 106.

The stem portion 188 is configured to operably connect to the turbine shaft 104. The turbine shaft 104 is inserted within an opening 189 within the stem portion 188 to operably connect to the stem portion 188. The opening 189 in the stem portion 188 opens towards the aft F2 direction. The opening 189 may be fit with a wave-spring that provides a force to bias the turbine shaft 104 to the right, ensuring positive contact with a driveshaft (e.g., within the shaft assembly 48) of the RAT assembly 40. (preloading 104 in compression prevents axial movement during RAT operation) The stem portion 188 may have a width W4 as measured along the turbine shaft axis 106. The stem portion 188 may have a diameter D4 as measured perpendicular to the turbine shaft axis 106.

The single-unit nose cone 180 may also have an opening 187 extending from the peak 181 of the dome portion 182 at the forward end 180 to the opening 189 within the stem portion 188 proximate the aft end 180b. The opening 187 extends along the turbine shaft axis 106. A preload bolt 200, may be inserted into the opening 187 to apply a preload to the turbine shaft 104 during assembly of the RAT assembly 40. The opening 187 may include a seat portion 185 as a seat for the preload bolt 200.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A single-unit nose cone for a ram air turbine, comprising:
    a dome portion located at a forward end of the single unit nose cone;
    a dome stand portion adjacent to the dome portion;
    a seat portion adjacent to the dome stand portion; and
    a stem portion adjacent to the seat portion and located at an aft end of the single-unit nose cone,
    wherein the dome portion, the dome stand portion, the seat portion, and the stem portion are composed from a single piece of material having a density of about 0.286 pound/cubic inch (7916 kilogram/cubic meter),
    wherein a diameter of the dome seat portion is greater than a diameter of the dome stand portion, and wherein the seat portion is interposed between the dome stand portion and the stem portion.

2. The single-unit nose cone of claim 1, wherein the dome stand portion is interposed between the dome portion and the seat portion.

3. The single-unit nose cone of claim 2, wherein the seat portion is interposed between the dome stand portion and the stem portion.

4. The single-unit nose cone of claim 1, wherein the material is steel.

5. The single-unit nose cone of claim 1, wherein the stem portion further includes an opening configured to operably connect to a turbine shaft of the ram air turbine, wherein the opening opens toward the aft end.

6. The single-unit nose cone of claim 5, further comprising:
an opening extending from a peak of the dome portion at the forward end of the single unit nose cone to the opening.

7. A ram air turbine assembly, comprising:
a nose housing having a snap ring groove;
a single-unit nose cone within the nose housing and secured to the nose housing via a snap ring in the snap ring groove, the single unit nose cone comprising;
a dome portion located at a forward end of the single unit nose cone;
a dome stand portion adjacent to the dome portion;
a seat portion adjacent to the dome stand portion, wherein the snap ring secures the sing-unit nose cone within the nose housing via the seat portion; and
a stem portion adjacent to the seat portion and located at an aft end of the single-unit nose cone,
wherein the dome portion, the dome stand portion, the seat portion, and the stem portion are composed from a single piece of material having a density of about 0.286 pound/cubic inch (7916 kilogram/cubic meter).

8. The ram air turbine assembly of claim 7, wherein the dome stand portion is interposed between the dome portion and the seat portion.

9. The ram air turbine assembly of claim 7, wherein the seat portion is interposed between the dome stand portion and the stem portion.

10. The ram air turbine assembly of claim 8, wherein the seat portion is interposed between the dome stand portion and the stem portion.

11. The ram air turbine assembly of claim 7, wherein the material is steel.

12. The ram air turbine assembly of claim 7, wherein the stem portion further includes an opening configured to operably connect to a turbine shaft of the ram air turbine, wherein the opening opens toward the aft end.

13. The ram air turbine assembly of claim 12, wherein the single-unit nose cone further comprises: an opening extending from a peak of the dome portion at the forward end of the single unit nose cone to the opening.

14. The ram air turbine assembly of claim 13, further comprising:
a preload bolt located within the opening.

15. A single-unit nose cone for a ram air turbine, comprising:
a dome portion located at a forward end of the single unit nose cone;
a dome stand portion adjacent to the dome portion;
a seat portion adjacent to the dome stand portion; and
a stem portion adjacent to the seat portion and located at an aft end of the single-unit nose cone,
wherein the dome portion, the dome stand portion, the seat portion, and the stem portion are composed from a single piece of material having a density of about 0.286 pound/cubic inch (7916 kilogram/cubic meter),
wherein a diameter of the dome seat portion is greater than a diameter of the dome stand portion, and
wherein the dome stand portion is interposed between the dome portion and the seat portion.

16. The single-unit nose cone of claim 15, wherein the material is steel.

17. The single-unit nose cone of claim 15, wherein the stem portion further includes an opening configured to operably connect to a turbine shaft of the ram air turbine, wherein the opening opens toward the aft end.

* * * * *